United States Patent [19]

Tornai

[11] Patent Number: 5,408,668
[45] Date of Patent: Apr. 18, 1995

[54] METHOD AND APPARATUS FOR CONTROLLING THE PROVISION OF POWER TO COMPUTER PERIPHERALS

[76] Inventor: Richard Tornai, 3125 Avis Way, Pinole, Calif. 94564

[21] Appl. No.: 98,577

[22] Filed: Jul. 28, 1993

[51] Int. Cl.$^6$ .............................................. G06F 1/32
[52] U.S. Cl. .................................... 395/750; 395/575; 371/66
[58] Field of Search ................ 395/750, 575; 364/707, 364/483; 371/14, 66

[56] References Cited

U.S. PATENT DOCUMENTS

| | | | |
|---|---|---|---|
| 4,698,748 | 10/1987 | Juzswik | 371/66 X |
| 4,794,525 | 12/1988 | Pickert et al. | 395/750 |
| 4,851,987 | 7/1989 | Day | 395/550 |
| 4,930,047 | 5/1990 | Peterson | 361/395 |
| 4,931,978 | 6/1990 | Drake et al. | 364/708.1 |
| 4,980,836 | 12/1990 | Carter et al. | 364/483 |
| 5,167,024 | 11/1992 | Smith et al. | 395/375 |
| 5,182,810 | 1/1993 | Bartling et al. | 395/750 |
| 5,220,671 | 6/1993 | Yamagishi | 395/750 |
| 5,230,074 | 7/1993 | Canova et al. | 395/750 |
| 5,250,851 | 10/1993 | McKnight et al. | 307/38 |

FOREIGN PATENT DOCUMENTS 3-168820 7/1991 Japan .............................. G06F 1/26

Primary Examiner—Jack B. Harvey
Assistant Examiner—Glenn A. Auve
Attorney, Agent, or Firm—Phong K. Truong; Albert C. Smith

[57] ABSTRACT

The provision of power to a peripheral of a computer system is controlled by first receiving input signals from an input source, such as a keyboard, mouse, printer port, or an occupancy sensor. The input signals are then processed to determine whether power should be provided to the peripheral, and if so, an activation signal is generated. In response to this activation signal, the peripheral is connected to an external power source, thereby turning the peripheral on. Thereafter, the input signals continue to be processed to determine whether power should be disconnected from the peripheral, and if so, a deactivation signal is generated. The peripheral is disconnected from the power source in response to the deactivation signal to turn the peripheral off. An apparatus for carrying out the method described above comprises an input port for receiving the input signals, a processor the processing the input signals, and a connection circuit for selectively connecting the peripheral to a power source. The input port receives the input signals and passes them on to the processor. The processor monitors the input signals for input signal activity, and if there is input signal activity, the processor processes the input signals to determine whether the peripheral needs to be turned on. If so, the processor generates and sends an activation signal to the connection circuit to cause the connection circuit to connect the peripheral to a power source, thereby, turning the peripheral on. Thereafter, the processor continues to monitor the input signals for input signal activity, and if no activity is detected, the processor starts a timer having a selected time limit. If no activity is detected before the time limit expires, the processor generates and sends a deactivation signal to the connection circuit, which causes the connection circuit to disconnect the peripheral from the power source, thereby, turning the peripheral off. Thus, the peripheral is automatically turned off when it is not needed in order to minimize the power consumed by the peripheral.

15 Claims, 6 Drawing Sheets

METHOD AND APPARATUS FOR CONTROLLING THE PROVISION OF POWER TO COMPUTER PERIPHERALS

FIELD OF THE INVENTION

This invention relates to computer systems and more particularly to a method and apparatus for selectively providing power to the various peripherals in a computer system to minimize the energy consumed by the system.

DESCRIPTION OF THE PRIOR ART

A typical computer system comprises a central processing unit (CPU), a memory, a keyboard, and various peripherals such as a display monitor and a printer, to name a few. In normal usage, it is common for the peripherals to be turned on and to remain on for as long as the computer is running, even though the peripherals are actually used only a small percentage of the time. This means that for a large part of their "on" time, the peripherals remain idle, consuming energy without performing their intended functions. This leads to the unnecessary consumption of a considerable amount of energy, especially where a large number of peripherals are involved. This unnecessary consumption results in the waste of valuable energy resources.

Currently, it is believed that there is no device available for reducing the amount of energy consumed by idle display monitors. However, for reducing the energy consumption of idle laser printers, there are available energy saving devices which reside within the laser printers which reduce the amount of power consumed by the printer when the printer remains idle for a certain amount of time. These devices are capable of reducing the energy consumed by idle printers by fifty percent or more. While a fifty percent reduction in energy consumption is an improvement, it is still not optimal because energy is still being consumed unnecessarily, albeit on a smaller scale. Ideally, peripherals should be turned on only when they are in use and turned off the remainder of the time. Currently, however, there is no device believed to be available which automatically and satisfactorily accomplishes this purpose.

SUMMARY OF THE INVENTION

In accordance with the present invention, there is provided a method and apparatus for selectively providing power to one or more peripherals of a computer system to minimize the energy consumed by the system. Energy consumption is minimized by turning the peripherals on only when the peripherals are used, and turning the peripherals off the remainder of the time. This is preferably achieved by first receiving and monitoring various signals passing between the computer and the peripherals. These input signals may include signals from a keyboard, a mouse, a printer port of the computer, and an occupancy sensor, to name a few. The input signals are thereafter processed to determine whether any of the peripherals needs to be turned on, and if so, which one and for how long. Where it is determined that a selected peripheral should be turned on, an activation signal is generated, and in response to this signal, the selected peripheral is connected to an external power source, thereby turning the peripheral on. After the peripheral is on, the input signals continue to be processed to determine whether the peripheral should remain on. If the peripheral is no longer being used, a deactivation signal is generated, which causes the peripheral to be disconnected from the power source. Hence, the peripheral is turned off when it is no longer needed.

The apparatus of the present invention comprises at least one input port for receiving input signals, a processor for processing the input signals, and a connection circuit for selectively connecting a peripheral to a power source. In operation, the input port receives the input signals described above and passes these signals on to the processor. The processor processes these signals to determine whether any of the peripherals needs to be turned on, and if so, which one and for how long. This processing is preferably performed by monitoring the input signals for input signal activity. If it is determined that a particular peripheral should be turned on, the processor generates an activation signal and sends this signal to the connection circuit. The connection circuit responds to the activation signal by connecting the appropriate peripheral to a power source, thereby turning the peripheral on.

After power has been provided to a peripheral, the processor continues to monitor the input signals for signal activity to determine whether the peripheral should remain on. If the processor determines that a peripheral is no longer being used, it starts a timer having a selected time limit. The processor thereafter continues to monitor the input signals for signal activity, and if signal activity is detected, the timer is reset and the peripheral remains connected to the power source. However, if no input signal activity is detected before the expiration of the time limit, then the processor generates a deactivation signal and sends this signal to the connection circuit. The deactivation signal causes the connection circuit to sever the connection between the peripheral and the power source, thus, automatically turning the peripheral off when it is not utilized in order to conserve energy.

DETAILED DESCRIPTION OF THE PREFERRED EMBODIMENT

Figure 1:
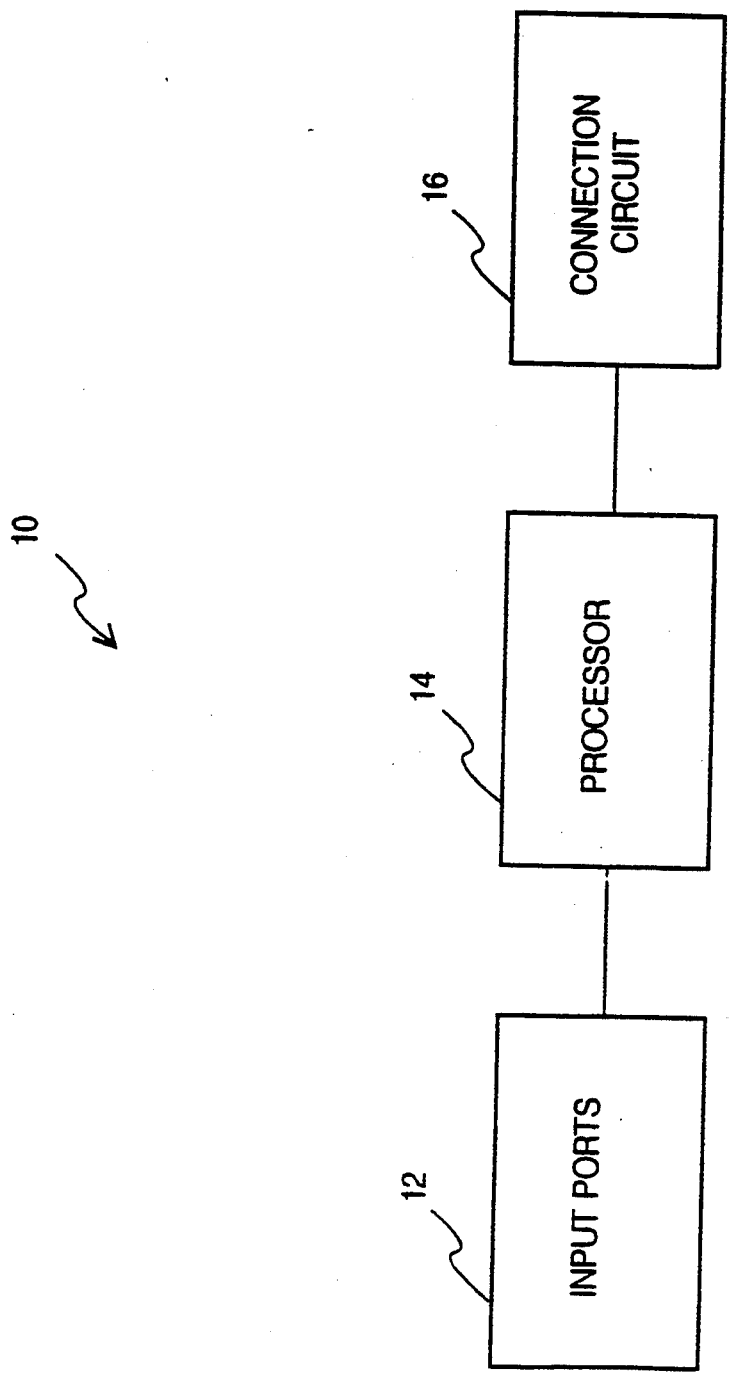
FIG. 1 is a simplified block diagram of the apparatus of the present invention.

A computer system typically includes the computer itself and a number of peripherals. To minimize the amount of energy consumed by the system, the peripherals are preferably turned on only when they are used, and turned off the remainder of the time. The present invention provides a method and apparatus for automatically determining when certain peripherals are needed, and thus should be turned on, and when certain peripherals are not needed, and thus should be turned off. With reference to FIG. 1, there is shown a simplified block diagram of the apparatus 10 of the present invention, wherein the apparatus 10 comprises at least one input port 12 for receiving input signals, a processor 14 coupled to the input port 12 for processing the input signals, and a connection circuit 16 coupled to the processor 14 for selectively connecting a peripheral (not shown) to a power source. The input port 12 receives input signals from the computer or from a device external to the computer, and passes these signals on to the processor 14 for processing. Based on the input signals, processor 14 determines whether any of the peripherals should be turned on or activated and, if so, which peripheral should be activated. Where it is determined that a particular peripheral should be activated, processor 14 generates an activation signal which is transmitted to the connection circuit 16. Circuit 16 responds to the activation signal by connecting the appropriate peripheral to a power source, thus, activating the peripheral. In this manner, a peripheral is turned on when it is needed.

Thereafter, processor 14 continues to process the various input signals received on input port 12 to determine whether any of the peripherals are no longer needed, and thus, should be deactivated. If processor 14 determines that a particular peripheral is no longer being used, it starts a timer having a selected time limit. After starting the timer, processor 14 monitors the input signals for input signal activity, and if signal activity is detected, the timer is reset and the peripheral remains on. However, if no input signal activity is detected before the expiration of the time limit, processor 14 generates and sends a deactivation signal to the connection circuit 16 to cause the circuit 16 to disconnect the appropriate peripheral from the power source. Hence, the apparatus 10 automatically and efficiently deactivates idle peripherals to prevent the unnecessary consumption of energy.

Figure 2:
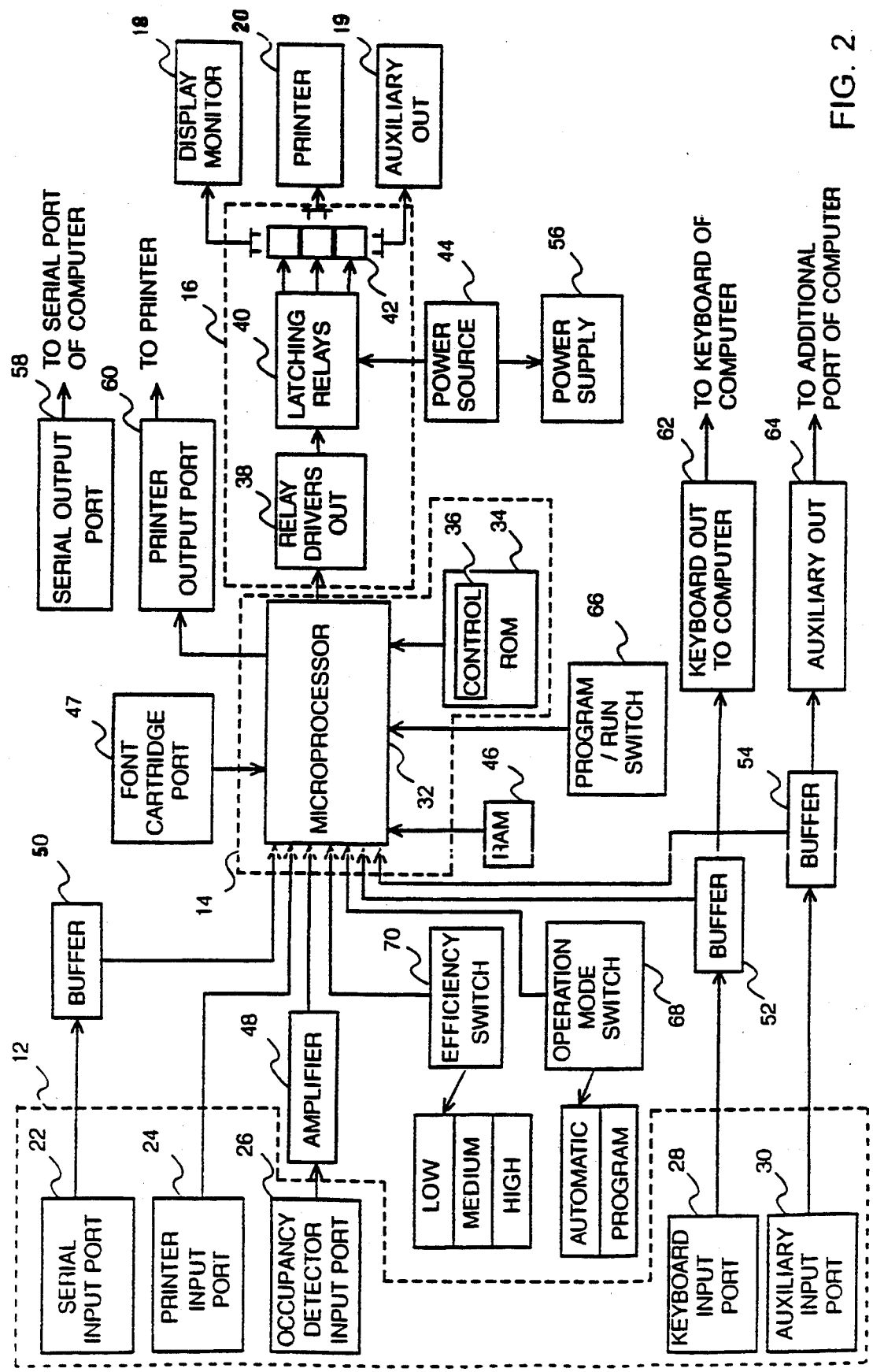
FIG. 2 is a detailed block diagram of the apparatus of the present invention.

With reference to FIG. 2, there is shown a detailed block diagram of the apparatus 10 of the present invention. In the preferred embodiment shown in FIG. 2, the apparatus 10 controls the provision of power to a display monitor 18 and a printer 20, but it should be noted that other peripherals may be controlled using the principles and apparatus disclosed herein. As shown in FIG. 2, input ports 12 preferably comprises a plurality of input ports, including a serial input port 22 for receiving signals from a serial device such as a mouse (not shown), a printer input port 24 for receiving printer data signals and for downloading customized control programs from the printer port of a computer (not shown), an occupancy detector input port 26 for receiving signals from an external occupancy sensor (not shown), a keyboard input port 28 for receiving signals from a keyboard (not shown), and an auxiliary input port 30 for receiving signals from an auxiliary device, such as a second serial device (having digital inputs) or an analog device. These input ports 22, 24, 26, 28, 30 provide the input signals needed by the processor 14 to determine whether and when the monitor 18 and printer 20 need to be activated. By monitoring multiple sets of input signals associated with computer use, the processor 14 is able to determine with a high degree of accuracy when a peripheral is needed and, thus, should be turned on.

In the preferred embodiment, processor 14 comprises a microprocessor 32, which may be a 8051 microprocessor manufactured by Intel Corporation of Santa Clara, Calif., and a read only memory (ROM) 34 coupled to microprocessor 32 in which is stored a control program 36. The control program 36, which dictates the operation of microprocessor 32, is executed by microprocessor 32 to control the overall operation of the apparatus 10. Control program 36 and the operation of apparatus 10 will be described in greater detail in a subsequent section.

The connection circuit 16 preferably comprises a set of relay driver circuits 38 and a set of latching relays 40. Relay drivers 38 are coupled to processor 14 to receive activation and deactivation signals therefrom, and in response, relay drivers 38 drive the latching relays 40 to either connect or disconnect the peripheral power receptacles 42 from the external power source 44. The power receptacles 42 are designed to receive the power plugs of the monitor 18 and printer 20. Thus, when the latching relays 40 connect the receptacles 42 to the power source 44, the relays are in effect connecting the monitor 18 or the printer 20 to the power source 44, thereby turning on the appropriate peripheral. Preferably, there is a separate relay 40 for each of the peripherals 18, 20 so that monitor 18 and printer 20 may be independently connected and disconnected from the power source 44.

In addition to input ports 12, processor 14, and circuit 16, apparatus 10 preferably further comprises signal buffers 50, 52, 54 and output ports 58, 60, 62, 64. Buffers 50, 52, 54, receive the input signals from input ports 22, 28, and 30, respectively, and pass these signals on to processor 14 and to output ports 58, 62, and 64, respectively. Buffers 50, 52, 54 primarily serve to intercept the input signals and to isolate the intercepted signals from the output ports 58, 62, 64. If desired, buffers 50, 52, 54 may also temporarily store the input signals received. Storing the input signals in this manner is preferred because it affords the processor 14 the luxury of not having to process the input signals in real time. With regard to the output ports 58, 62, and 64, these ports are preferably connected to a serial port of a computer, a keyboard port of the computer, and an auxiliary port of the computer (analog or digital), respectively. These output ports 58, 62, 64 serve the purpose of passing the input signals stored in buffers 50, 52, 54 on to the originally intended ports of the computer. By temporarily intercepting and then passing the input signals in this way, the apparatus 10 is able to monitor and process the input signals without interfering with the normal operation of the computer system.

Apparatus 10 preferably further comprises an amplifier 48 for amplifying the occupancy detector input signals received on input port 26, a power supply 56 for providing power to the various components of the apparatus 10, a random access memory (RAM) 46, and switches 66, 68, 70. The functions of these components are described in a subsequent section herein.

Figure 3:
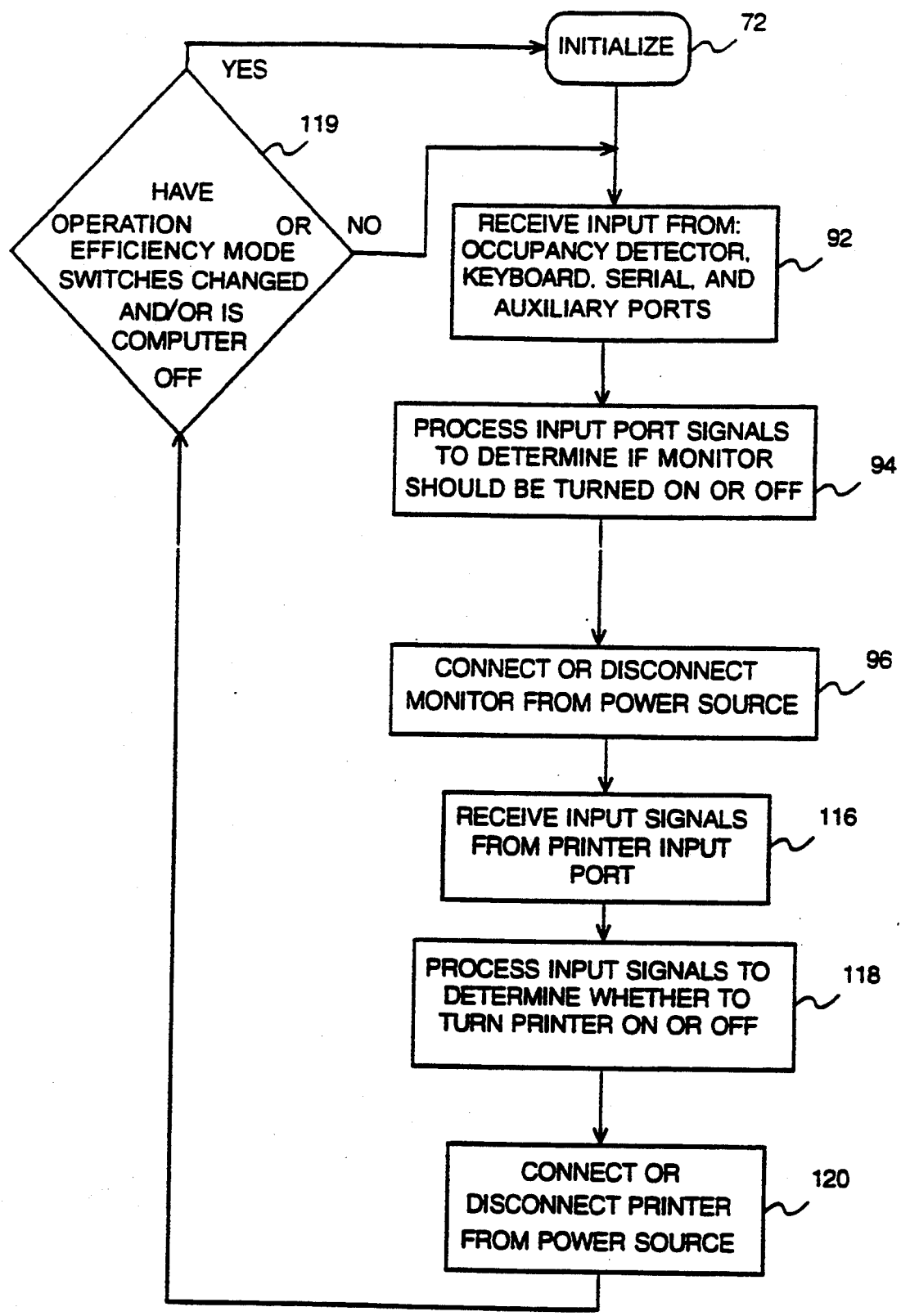
FIG. 3 is a flow diagram illustrating the sequence of operation of the apparatus of the present invention.

As mentioned above, the control program 36 stored within ROM 34 is executed by microprocessor 32 to control the operation of processor 14 and, hence, the operation of the overall apparatus 10. With reference to FIG. 3, there is shown a flow diagram to illustrate the sequence of operation of the apparatus 10. As shown in FIG. 3, the first step implemented by processor 14 is to initialize 72 the apparatus 10 for operation. The initialization step 72 is shown in greater detail in FIG. 4, wherein the first step performed by processor 14 is to determine 73 whether the computer connected to apparatus 10 is powered on. This is preferably achieved by checking the serial input port 22, the printer input port 24, the keyboard input port 28, and the auxiliary input port for a +5 volts signal. If a +5 volts signal is detected on any of these input ports, it is a good indication that the computer is already activated. If the computer is already on, then processor 14 generates a monitor activation signal to cause the connection circuit 16 to turn on 75 the monitor 18. If the computer is off, processor 14 loops back 73 to check again for an indication that the computer has been activated, and this loop continues indefinitely until it is determined that the computer has been powered on. Step 73 ensures that the monitor will not be turned on until the computer is activated. This step eliminates the waste of energy associated with providing power to an unused monitor.

After it is determined that the computer is on, the processor 14, in addition to turning the monitor 18 on, also generates 75 a "printer on-line" signal, which is sent back to the computer via port 24. This "on-line" signal is important because it prevents the computer from generating an error message. To elaborate, when a computer is ready to send data to a printer, it first determines whether the printer is ready or "on-line". If the printer is off and, thus, not "on-line", the computer will generate an error message and will refuse to send the data. By generating and sending an "on-line" signal to the computer, processor 14 is tricking the computer into thinking that the printer is on when, in actuality, the printer is off. In effect, processor 14 is emulating an active printer to cause the computer to behave as if the printer were actually "on-line".

After activating the monitor 18 and generating the "printer on-line" signal, processor 14 proceeds to determine 74 whether the apparatus 10 is in program mode. This determination is made by checking the status of the program/run switch 66 (FIG. 2), which is set by the user. If switch 66 has been set to the "run" setting, processor 14 simply proceeds to the next step 79 of the flow diagram, but if switch 66 is instead set to the "program" setting, then processor 14 responds by receiving 76 data from the computer via the input printer port 24 (FIG. 2), and storing this data in RAM 46 (FIG. 2). The data stored within RAM 46 is in effect a customized control program which may be executed by processor 14 in lieu of the control program 36 stored within ROM 34. By loading an individualized control program into RAM 46, a user can customize the apparatus 10 to fit his specific needs. This capability of the apparatus 10 provides the user with great flexibility.

The next step performed by processor 14 is to check 79 the operation mode switch 68 for a "program" setting. If this setting is found, processor 14 stops execution of the control program 36 in ROM 34 and executes 81 the customized program previously loaded into the RAM 46 instead, thereby carrying out the specific instructions of the user. If the "program" setting is not found, however, then processor 14 continues to execute the control program 36 stored in ROM 34.

If the operation mode switch 68 is not set to program, then the processor 14 proceeds to check 78 the status of the efficiency switch 70 by looking 78 for a "low" setting. If a "low" setting is found, processor 14 sets 80 the system timer values to a low value and exits the initialization process. If a "low" setting is not found, processor 14 proceeds to look 82 for a "medium" setting. If a "medium" setting is found, processor 14 sets 84 the system timer values to a medium value and exits the initialization process. Otherwise, processor 14 sets 86 the system timer values to a high value and exits the initialization phase. The system timer values are maintained by processor 14 for controlling the length of time a peripheral may remain idle before being turned off. Processor 14 uses these values in determining when to generate a deactivation signal to turn the peripheral off. By setting the efficiency switch 70, a user can dictate the frequency with which the peripherals will be turned off.

Referring again to FIG. 3, after apparatus 10 is initialized 72, it is ready to perform the functions necessary to control the provision of power to the display monitor 18 and the printer 20. With regard to FIG. 3, steps 92, 94, and 96 are performed by processor 14 to control the activation and deactivation of the monitor, and steps 116, 118, and 120 are performed to control the activation and deactivation of the printer 20. These steps are carried out in a continuous loop which includes step 119 in which the processor determines 119 whether the settings of any of the switches 66, 68, 70 have been changed and whether the computer has been turned off. If either of these conditions is satisfied, apparatus 10 is reinitialized 72. Otherwise, processor 14 proceeds to perform the steps necessary to control the monitor 18 and the printer 20.

Figure 5:
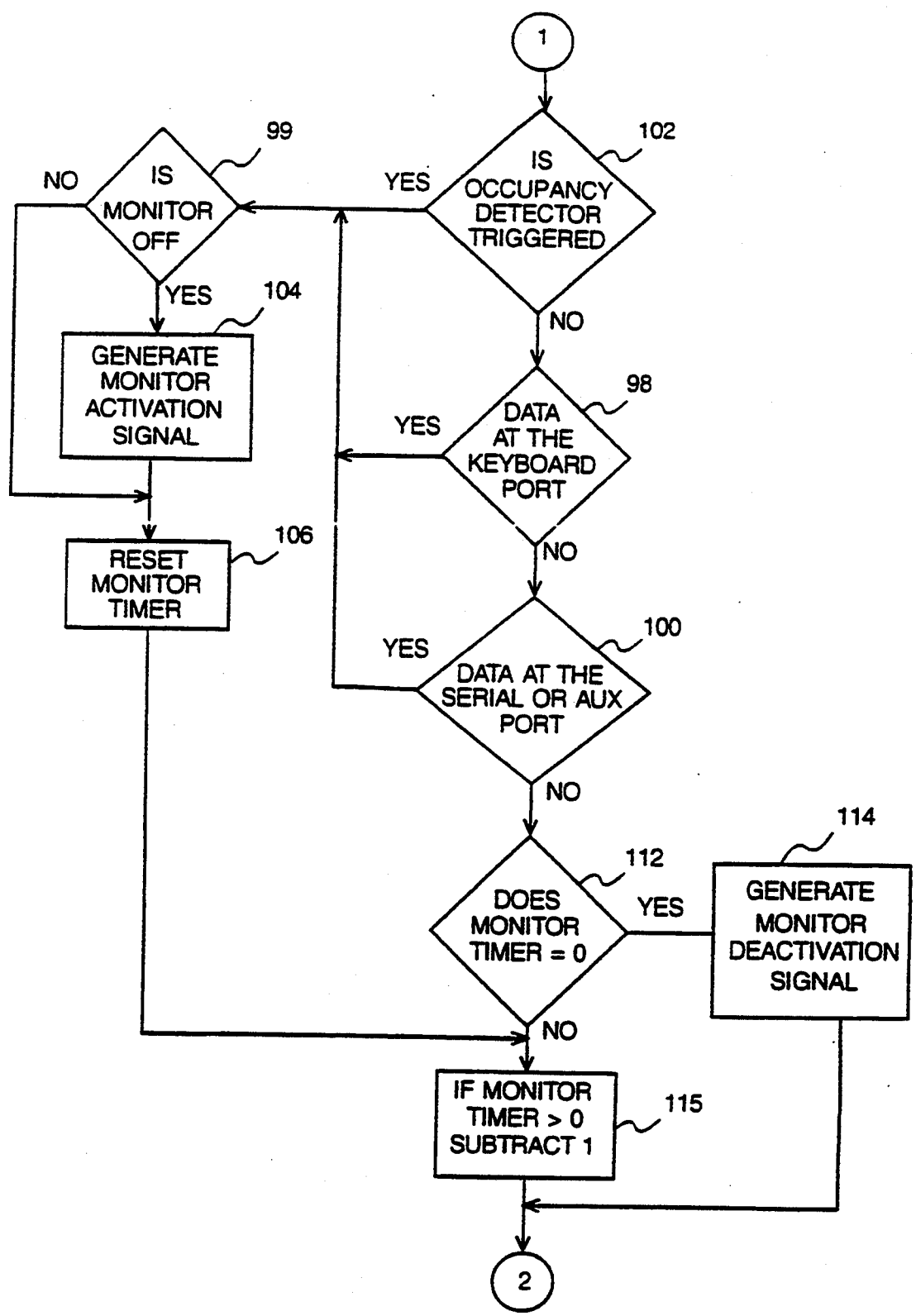
FIG. 5 is a flow diagram of the processing step 94 shown in the flow diagram of FIG. 3.

The control of the monitor 18 will now be described. As shown in FIG. 3, the first step performed in controlling the monitor 18 is to receive 92 input signals from the occupancy detector input port 26, the keyboard input port 28, the serial input port 22, and the auxiliary input port 30. These signals are passed on to the processor 14 and are processed 94 to determine whether the monitor should be turned on or off. Thereafter, the connection circuit 16 connects or disconnects 96 the monitor from the power source 44, depending upon whether the monitor should be on or off. With reference to FIG. 5, the process of controlling the provision of power to monitor 18 is shown in greater detail.

Processor 14 begins processing by monitoring 102 amplifier 48 for signal activity from the occupancy detector input port 26. The occupancy detector input port 26 is preferably connected to the output of an external occupancy detector (not shown) which is placed within close proximity of the computer to detect occupancy within a selected spatial area around the computer. Such an occupancy detector may take the form of a passive infra-red (PIR) detector, a pressure activated plate, or a number of other occupancy sensors which generate electrical signals when occupancy of a selected area is detected. Signal activity from amplifier 48 indicates that the user is probably within close proximity of the computer, which means that the monitor 18 should probably be on to allow the user to view the display. By activating the monitor 18 in response to signals from the occupancy detector, apparatus 10 anticipates use of the monitor by the user. This anticipation activates the monitor 18 before the user actually needs to use the monitor, which reduces the delay of operation experienced by the user caused by the monitor warm up time.

In addition to monitoring amplifier 48 for signal activity, processor 14 also checks 98, 100 for input signal activity from the keyboard input port 28, the serial input port 22, and the auxiliary input port 30. This is preferably accomplished by monitoring buffers 52, 50, and 54 for signal activity. Signal activity on buffer 52 indicates that the user is inputting data via the keyboard, which means that the display monitor should probably be on to allow the user to view the inputted information. Signal activity on buffers 50, 54 indicates that the user is using a mouse or some other input device, which means that the user most likely wishes to view the display on the monitor. Thus, if input signal activity is detected on any one or a combination of the input ports 22, 26, 28, 30, the monitor 18 should be turned on. Monitoring multiple inputs associated with computer use in this manner allows the processor 14 to determine with a high degree of accuracy when the monitor needs to be activiated.

In response to input signal activity on any of the input ports 22, 26, 28, 30, processor 14 checks 99 to determine whether the monitor 18 is currently activated. If the monitor is off, processor 14 generates 104 and sends a monitor activation signal to the connection circuit 16 to cause the circuit 16 to connect the monitor 18 to power source 44, thereby turning the monitor on. If the monitor is already on, processor 14 resets 106 the monitor timer maintained by the processor 14, which serves to renew the period of time that the monitor remains in the "on" state. After resetting the monitor timer 106, processor 14 decrements 115 the monitor timer by one and proceeds to the printer control portion of the control program 36.

If no signal activity is detected in steps 102, 98, or 100, then it is likely that the user is no longer actively using the computer, which means that the monitor may be displaying information needlessly. To prevent the prolonged display of unviewed information, processor 14 checks 112 the monitor timer for a zero value. Where the monitor timer is not yet equal to zero, processor 14 decrements 115 the timer by one and goes on to execute the printer control portion of the control program 36. However, if the monitor timer is equal to zero, then it means that the user has not been actively using the computer for some selected time limit, with the time limit being dictated by the setting of the efficiency switch 70. Consequently, the monitor should be deactivated to conserve energy. To deactivate the monitor, processor 14 generates 114 and sends a monitor deactivation signal to connection circuit 16, which causes circuit 16 to disconnect the monitor from the power source 44 to turn the monitor off. After deactivating monitor 18, processor 14 proceeds to perform the functions necessary to control the printer 20.

Referring once again to FIG. 3, apparatus 10 controls the provision of power to printer 20 by carrying out steps 116, 118, and 120. Apparatus begins printer control operations by first receiving 116 input printer signals on printer input port 24. Processor 14 thereafter processes 118 these input printer signals to determine whether the printer should be turned on or off and, based on this determination, the connection circuit 16 connects or disconnects 120 the printer 20 from the power source 44. The process of controlling the provision of power to printer 20 is shown in greater detail in FIG. 6.

Figure 6:
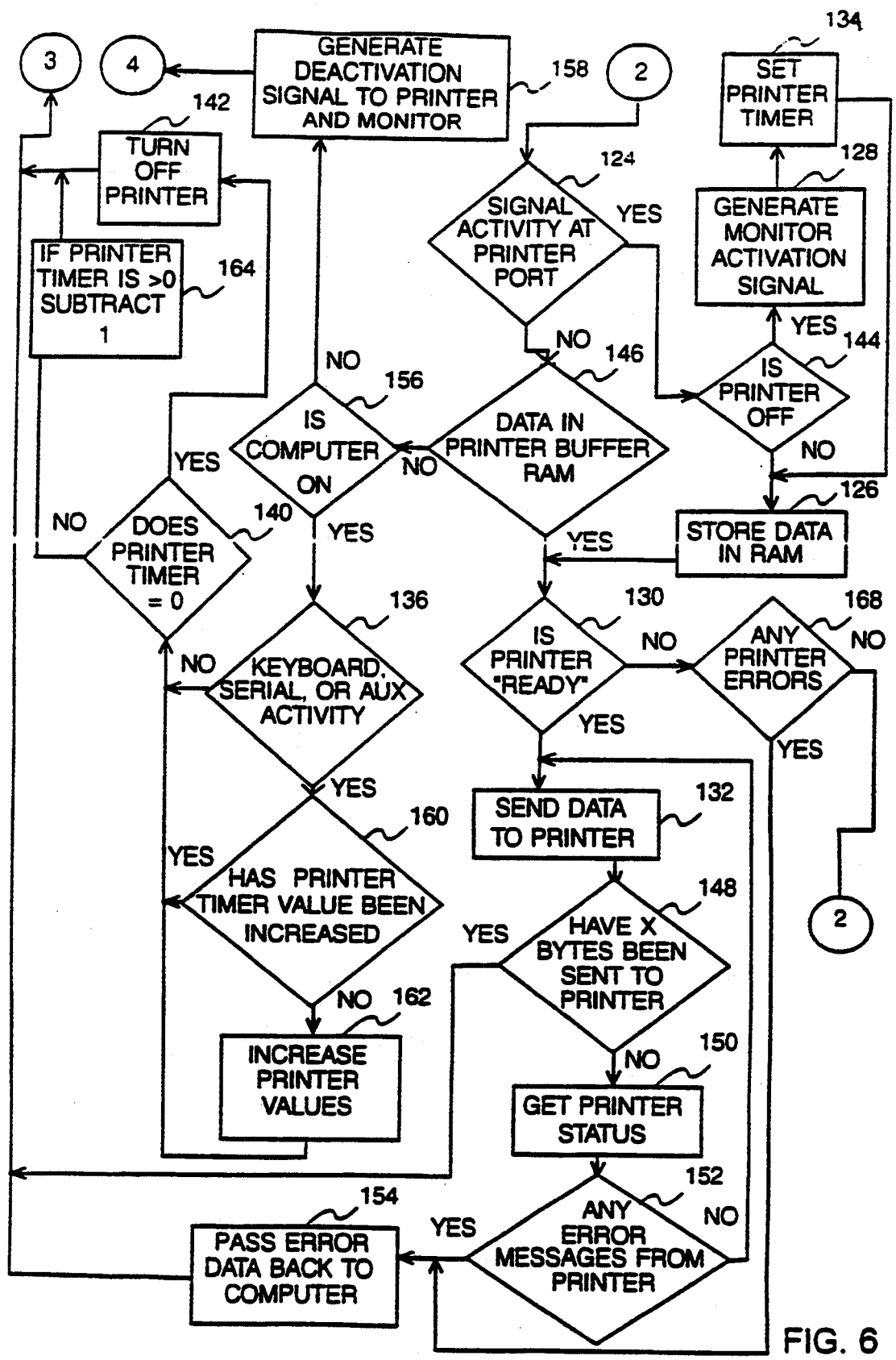
FIG. 6 is a flow diagram of the processing step 118 shown in the flow diagram of FIG. 3.

With reference to FIG. 6, the first step performed by processor 14 in controlling printer 20 is to monitor 124 the input signals from printer input port 24 for signal activity. Recall that processor 14 is supplying a "printer on-line" signal to the computer via the printer port 24. Thus, the computer will send printer signals to the printer input port 24 if the computer has something to print. If input signal activity is detected, processor 14 responds by first checking 144 the on/off status of the printer 20. If the printer is on, processor 14 proceeds to load 126 the data received from the printer input port 24 into RAM 46. If the printer is off, processor 14 generates 128 a printer activation signal to turn the printer on since it is known at this point that the printer is needed.

Thereafter, processor 14 sets the printer timer 134 to an initial value determined by the setting of efficiency switch 70, and stores 126 the print data 126 into RAM 46. The storing of the print data is necessary because, at this point in time, the printer 20 has not yet had time to initialize and, thus, is incapable of receiving the printer data. If the printer data is not stored in RAM 46, it will be lost.

The data transmitted by the computer may include two types of information, data and font information. When font information is sent by the computer, processor 14 detects the font information and labels it as such within RAM 46. Since font information is lost by the printer 20 each time the printer is turned off, processor 14 will send the stored font information to the printer 20 each time the printer is turned on. To further enhance the font capability of the apparatus 10, the apparatus 10 may further comprise a font cartridge port 47 for accommodating a font cartridge. Processor 14 sends the information stored in the font cartridge to the printer 20 to improve the font capability of the printer and to reduce printing time.

After the printer data is stored within RAM 46, processor 14 checks 130 for a "printer ready" signal from the printer 20 by monitoring the printer output port 60, which is connected to the printer 20. If the printer is not ready, processor 14 checks 168 for possible errors that may have been generated by the printer, such as, "out of paper", "paper jam" etc. Any errors received from the printer 20 through port 60 will be processed by processor 14 and sent 154 back to the computer via input port 24. One advantage of handling errors in this manner is that, if a printer error does occur, none of the print data is lost because it is stored within RAM 46. After the error is corrected, the print data may simply be retrieved from the RAM 46.

Figure 4:
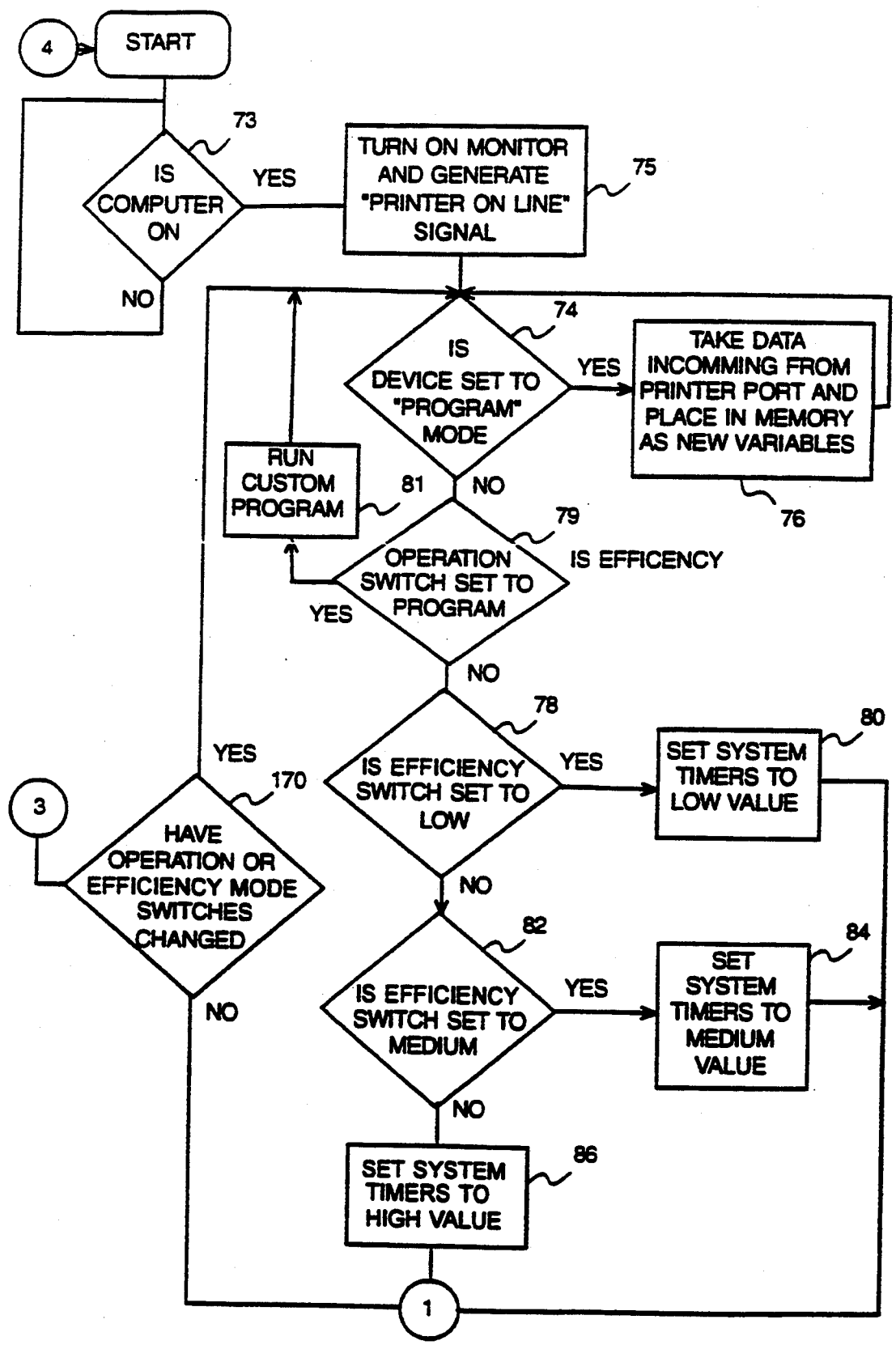
FIG. 4 is a flow diagram of the initializing step 72 shown in the flow diagram of FIG. 3.

If no printer errors have occurred, processor 14 loops back to check 124 for additional signal activity 124 at the printer input port 24. If no signal activity is detected, processor 14 checks the RAM 46 for stored data. At this point, there should be printer data stored in the RAM 46. Thus, processor 14 proceeds to check 130 again for a "printer ready" signal. Processor continues checking for errors and for the "printer ready" signal until the printer 20 is ready to receive the print data. When the printer 20 has warmed up sufficiently and is ready for printing, it sends a "printer ready" signal to output port 60. Processor 14 responds to this signal by sending 132 the printer data stored within RAM 46 to the printer. Thereafter, processor 14 determines 148 how many bytes of data have been sent to the printer 20. If a predetermined maximum number of bytes have been sent, transmission of data to the printer is halted and processor 14 loops back to step 170 (FIG. 4). This is done so that large print jobs do not prevent the apparatus 10 from carrying out the monitor control functions shown in FIG. 5. If the maximum number of bytes has not yet been sent, processor 14 checks 150 the status of the printer 20, checks 152 for any error messages from the printer 20, and continues to send 132 more data to the printer 20.

Where the transmission of print data is halted due to step 148, there will be data stored in RAM 46 the next time processor 14 performs step 146. Hence, processor 14 repeats steps 130, 132, 148, 150, 152, 154, and 168. Eventually, all of the data stored within RAM 46 will be sent to the printer 20. After all of the print data stored in RAM 46 has been sent, the RAM 46 will no longer contain any printer data. Thus, the next time processor 14 carries out step 146, it will branch off to step 156 to verify that the computer is still on. If the computer has been shut off, printer 20 and monitor 18 are no longer needed. Consequently, processor 14 generates 158 and sends deactivation signals to the connection circuit 16 to turn off monitor 18 and printer 20. With the computer off, processor 14 returns to the initialization process and runs in a loop 73 (FIG. 4) until the computer is turned on again by the user.

Where the computer is still on, processor 14 checks 136 for signal activity on the serial input port 22, the keyboard input port 28, and the auxiliary input port 30. Signal activity on these ports 22, 28, 30 indicates that the user is still actively using the keyboard, the mouse, or an auxiliary device, which increases the probability that another print job is forthcoming. To anticipate additional print jobs and to prevent short cycling of the printer 20, the time limit on the printer timer is doubled 162 if signal activity is detected on ports 22, 28, 30, but the timer value is doubled only if it is determined 160 that the timer has not been previously doubled during the current print job. This is done to prevent the timer value from being excessively doubled, which leads to maintaining the printer in the "on" state long after it is in use.

If there is no signal activity on the keyboard, serial, and auxiliary input ports 22, 28, 30, or if the printer timer has already been increased, or if the printer timer has just been doubled, processor 14 proceeds to check 140 the printer timer value. If the timer value is equal to zero, processor 14 generates 142 a printer deactivation signal to turn the printer off. If the timer value is greater than zero, processor 14 decrements 164 the printer timer value by one. Thereafter, processor 14 loops back to step 170 to determine whether any of the operation mode switches 68, 70, or 66 (FIG. 2) have been changed. If any of the switches have been changed, processor 14 starts the initialization sequence again. Otherwise, processor 14 proceeds to carry out the steps necessary to control the provision of power to the monitor 18 and the printer 20. In the manner described above, apparatus 10 automatically and logically determines when the monitor 18 and printer 20 are needed. In accordance with this determination, monitor 18 and printer 20 are turned on only when needed and turned off the remainder of the time. Thus, energy consumption by the peripherals is minimized.

What is claimed is:

1. In a computer system having at least one peripheral having a power plug, an apparatus for controlling power provision to said peripheral, comprising
    an input port for receiving input signals;
    a processor for processing said input signals to determine whether power should be provided to said peripheral, said processor generating an activation signal in response to a determination that power should be provided to said peripheral;
    a power receptacle for receiving said power plug;
    a connection circuit responsive to said activation signal for coupling said power receptacle to a power source, thereby providing power to said peripheral; and
    a memory;
    wherein said processor receives and stores a set of user instructions in said memory, and wherein said processor executes said user instructions to carry out a set of user-desired functions.

2. In a computer system having at least one peripheral having a power plug, an apparatus for controlling power provision to said peripheral, comprising
    an input port for receiving input signals;
    a processor for processing said input signals to determine whether power should be provided to said peripheral, said processor generating an activation signal in response to a determination that power should be provided to said peripheral, and generating a deactivation signal in response to a determination that power should be disconnected from said peripheral;
    a power receptacle for receiving said power plug; and
    a connection circuit responsive to said activation signal for coupling said power receptacle to a power source, thereby providing power to said peripheral, and responsive to said deactivation signal for decoupling said power receptacle from said power source;
    wherein said processor processes said input signals to determine whether a computer to which said peripheral is coupled has been activated, said processor generating said deactivation signal in response to a determination that said computer has not been activated.

3. In a computer system having at least one peripheral, an apparatus for controlling power provision to said peripheral, comprising:
    an input port for receiving input signals;
    an occupancy sensor coupled to said input port for generating said input signals when a selected spatial area is occupied by a user;
    a processor for monitoring said input signals for input signal activity, said processor generating an activation signal if input signal activity is detected; and
    a connection circuit responsive to said activation signal for coupling said peripheral to a power source.

4. The apparatus of claim 3, wherein said occupancy sensor comprises a passive infrared (PIR) detector.

5. The apparatus of claim 3, wherein said occupancy sensor comprises a pressure activated plate.

6. In a computer system having at least one peripheral having a power plug, an apparatus for controlling power provision to said peripheral, comprising:
    a first port for sending and receiving signals to and from a computer;
    a power receptacle for receiving said power plug;
    a processor for monitoring said first port for input signal activity, said processor generating and sending an "on-line" signal to said computer, said processor also generating an activation signal if input signal activity is detected; and
    a connection circuit responsive to said activation signal for coupling said power receptacle to a power source, thereby providing power to said peripheral.

7. The apparatus of claim 6, wherein said connection circuit comprises a latching relay.

8. In a computer system having at least one peripheral, an apparatus for controlling power provision to said peripheral, comprising:
    a first port for sending and receiving signals to and from a computer;
    a random access memory (RAM) for storing signals received from said computer via said first port;

a processor for monitoring said first port for input signal activity, said processor generating and sending an "on-line" signal to said computer, said processor also generating an activation signal if input signal activity is detected; and a connection circuit responsive to said activation signal for coupling said peripheral to a power source.

9. The apparatus of claim 8, further comprising a second port for sending and receiving signals to and from said peripheral.

10. The apparatus of claim 9, wherein said processor further monitors said second port for a "ready" signal from said peripheral, said processor responding to said "ready" signal by sending the signals stored within said RAM to said peripheral via said second port.

11. In a computer system having at least one peripheral, a method for controlling power provision to said peripheral, comprising the steps of:

receiving input signals from a computer;

generating and sending an "on-line" signal to said computer to indicate that said peripheral is on-line, said "on-line" signal being generated and sent regardless of whether said peripheral is actually on-line;

monitoring said input signals for input signal activity;

generating an activation signal if input signal activity is detected; and coupling said peripheral to a power source in response to said activation signal.

12. The method of claim 11, further comprising the step of:

storing said input signals received from said computer.

13. The method of claim 12, further comprising the steps of:

receiving peripheral signals from said peripheral;

monitoring said peripheral signals for a "ready" signal; and sending the stored input signals to said peripheral in response to said "ready" signal.

14. The method of claim 11, further comprising the steps of:

generating a deactivation signal if input signal activity is not detected; and disconnecting said peripheral from said power source in response to said deactivation signal.

15. The method of claim 11, further comprising the steps of:

starting a timer having a selected time limit if input signal activity is not detected;

checking said timer to determine whether said time limit has expired;

generating a deactivation signal in response to a determination that said time limit has expired; and disconnecting said peripheral from said power source in response to said deactivation signal.

* * * * *